United States Patent Office 3,594,207
Patented July 20, 1971

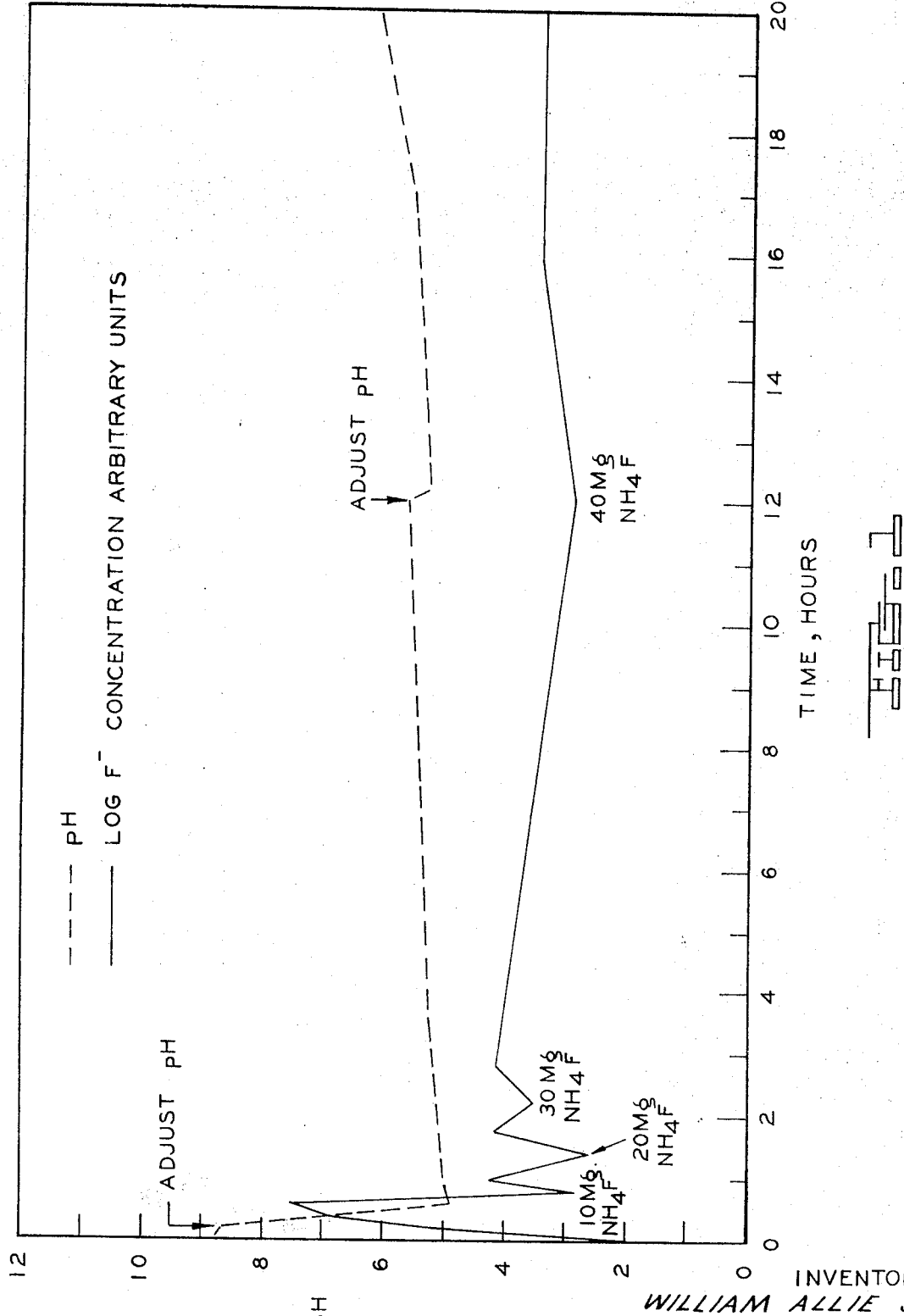

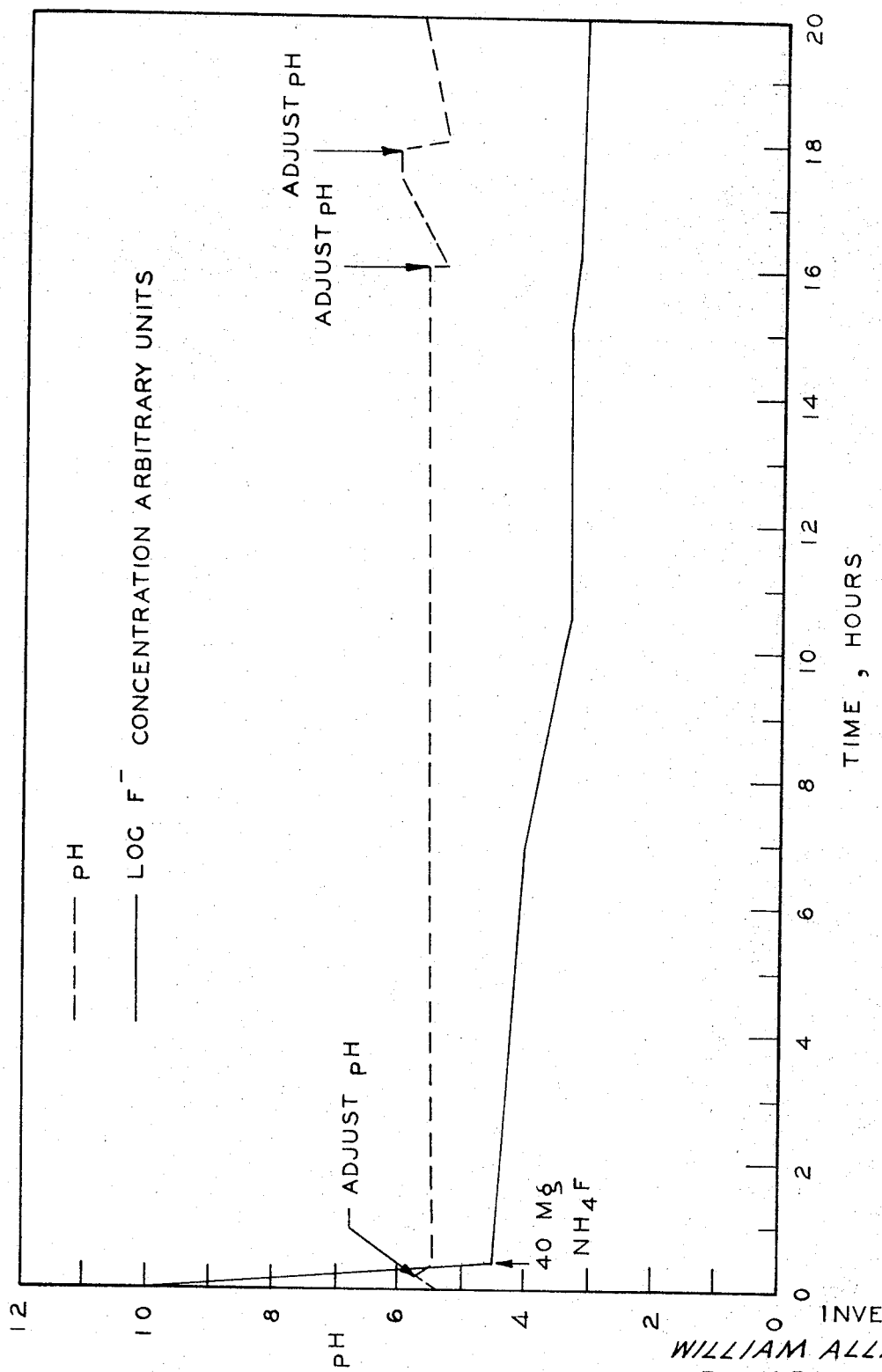

---

3,594,207
CATHODE RAY TUBE MANUFACTURE
William Allie, Jr., Dearborn, and Richard H. Marsh, Farmington, Mich., assignors to Ford Motor Company, Dearborn, Mich.
Filed May 1, 1969, Ser. No. 820,899
Int. Cl. H01j 3/20
U.S. Cl. 117—33.5CM                        1 Claim

---

ABSTRACT OF THE DISCLOSURE

This invention relates to a process for the preparation of the active face of a cathode ray tube employing as the phosphor europium doped yttrium oxide or gadolinium oxide. The yttrium oxide or gadolinium oxide is protected during manufacture by a fluoride coating deposited from a buffered suspension.

---

THE BACKGROUND

Cathode ray tube phosphors and particularly color television phosphors are frequently applied to the inner face of the tube in the form of a slurry containing the phosphor, isopropyl alcohol, polyvinyl alcohol and a small amount of ammonium dichromate. This slurry is spread on the inside of the picture tube and dried. A high intensity light beam is then directed at the locations where it is desired to have the phosphor remain. The intense light beam initiates crosslinking of the polyvinyl alcohol. The ammonium dichromate serves to catalyze this process. The non-reacted slurry and soluble salts are washed away and the ssytem baked and pumped dry.

THE INVENTION

The use of gadolinium oxide in this process is complicated by the comparatively high solubility of hydrated gadolinium oxide and its high rate of hydrolysis. These circumstances provide enough gadolinium ions to precipitate the insoluble gadolinium chromtae, thereby effectively removing the chromate ion from the reaction. Studies of slurries analyzed by means of an atomic absorption spectrophotometric determination of total chromium indicate that the rate of decrease of chromium concentration is pseudo first order with respect to chromium and has a half life of about one hour.

To be photosensitive, the pH of the slurry must not exceed six. This is apparent from Table 1 which is reproduced below and shows that the concentration of dichromate chromium falls off very rapidly at pH levels above about five.

TABLE 1

| pH | $HCRO_4$ | $CR_2O_7$ | $CRO_4$ |
|---|---|---|---|
| 1.00 | .0075 | .0025 | $4.5 \times 10^{-8}$ |
| 5.00 | .0073 | .0023 | .00044 |
| 5.10 | .0072 | .0023 | .00054 |
| 5.20 | .0071 | .0022 | .00068 |
| 5.30 | .007 | .0022 | .00084 |
| 5.40 | .0069 | .0021 | .001 |
| 5.50 | .0067 | .002 | .0013 |
| 5.60 | .0065 | .0019 | .0016 |
| 5.70 | .0063 | .0018 | .0019 |
| 5.80 | .0061 | .0016 | .0023 |
| 5.90 | .0058 | .0015 | .0028 |
| 6.00 | .0054 | .0013 | .0033 |
| 6.10 | .0051 | .0011 | .0038 |
| 6.20 | .0046 | .00095 | .0044 |
| 6.30 | .0042 | .00078 | .005 |
| 6.40 | .0037 | .00062 | .0056 |
| 6.50 | .0033 | .00048 | .0062 |

Table 1 is based upon 0.01 molar chromium solutions as a function of pH. Attempts to adjust the pH by the addition of acid merely result in the rapid dissolution of more gadolinium oxide followed by the precipitation of the chromate and the return of the pH to the eight to nine range.

This invention is predicated upon the protection of the gadolinium oxide by coating the individual oxide particles with a layer of insoluble gadolinium fluoride. This was done by the addition of a soluble fluoride such as ammonium fluoride followed by an adjustment and stabilization of the pH by the addition of a suitable buffering system. The preferred pH buffering system was acetic acid-ammonium acetate.

FIG. 1 has been prepared to demonstrate the pH values and fluoride concentrations obtained and the changes which occurred with the passage of time. The slurry so tested was prepared by adding to a 20 ml. sample a one percent ammonium fluoride solution and 1:1 acetic acid. Solid ammonium acetate was added as a buffer.

As can be seen from FIG. 1, the fluoride concentration immediately rose to a high value and remained there. Obviously, no precipitation of a protective layer of gadolinium fluoride took place. This is probably due to the fact that at values of pH greater than eight the solubility of gadolinium hydroxide is less than the solubility of gadolinium fluoride. With the addition of acetic acid, the fluoride concentration dropped rapidly toward a very low concentration. When more fluoride was added, the fluoride concentration rose rapidly and then fell as the gadolinium fluoride was precipitated. Eventually a point was reached where the final fluoride concentration leveled off at a concentration greater than the final concentration previously encountered. A sufficient amount of fluoride was considered to have been added when the fluoride concentration leveled off rather than dropping to a very low concentration.

After sufficient fluoride had been added and the pH adjusted, the system was monitored to observe the variation of pH and fluoride concentration as a function of time. FIG. 1 shows that both the pH and fluoride concentration held very well during the day. By the next morning, the fluoride level had dropped considerably below the equilibrium concentration and the pH had risen above the useful range. At this point, a small addition of fluoride was made and the pH adjusted back into the useful range. Again, both the fluoride concentration and the pH held very well during the day which demonstrates that the system can be regenerated.

FIG. 2 has been prepared to demonstrate the action of a properly prepared slurry. Here, a sufficient amount of fluoride was added to a sample of slurry. The system was permitted to stand overnight without stirring. As can be seen from FIG. 2, even though the pH had risen slightly, it was still in the working range. As a test, the pH was readjusted without the addition of fluoride. The increase in pH with respect to time, in this case, was considerably faster. This indicates that proper regeneration requires the addition of fluoride.

Ammonium dichromate was added to a treated slurry and the total chromium concentration determined throughout the day by atomic adsorption spectroscopy. There was no change in chromium concentration observed.

A typical slurry may be prepared as follows: A mixture of 14.4 liters of polyvinyl alcohol, 6 liters of isopropyl alcohol, 10 liters of water and 30 pounds of europium doped gadolinium oxide. To this was added 60 grams of ammonium fluoride, 200 grams of ammonium acetate and acetic acid to a pH of 5.5 or slightly less. Finally there was added 125 ml. of a solution formed by dissolving 40 pounds of ammonium dichromate in 24 gallons of water.

This method was further tested by substituting yttrium oxide for the gadolinium oxide. After addition of the ammonium fluoride and adjustment of the pH, both fluoride concentration and pH were monitored with respect to time. It was found that the fluoride concentration dropped slightly during an eight-hour period and that the pH increased from 4.9 to 5.25 during the same period.

This pH range is well within the necessary limit. On standing overnight, it was found that the fluoride concentration had dropped to a very low value and that the pH had risen to above the useful limit. During the initial test there was no apparent change in chromium concentration. Thus, yttrium can be directly substituted for gadolinium with the caveat that the stability of the pH value is somewhat less.

We claim as our invention:

1. A process for the manufacture of a cathode ray tube comprising preparing a photosensitive slurry containing gadolinium or yttrium oxide, stabilizing the pH of the slurry at a value not substantially above six by the addition of suitable buffering agents, forming a layer of gadolinium or yttrium fluoride upon the gadolinium or yttrium oxide phosphor, applying the buffered and fluorinated slurry to the face of a cathode ray tube, and exposing the face so coated to high intensity light to locally fix the slurry.

References Cited

UNITED STATES PATENTS 3,408,223  10/1968  Shortes _____ 117—33.5X

ALFRED L. LEAVITT, Primary Examiner

W. F. CYRON, Assistant Examiner

U.S. Cl. X.R.

117—100B, 118; 252—301.4R